Patented Sept. 24, 1940

2,215,966

UNITED STATES PATENT OFFICE 2,215,966

PREPARATION OF MAGNESIUM COMPOUNDS

Harley C. Lee and Elizabeth K. Lee, Columbus, Ohio, assignors, by mesne assignments, to Basic Dolomite, Inc., Cleveland, Ohio, a corporation of Ohio No Drawing. Application February 10, 1939, Serial No. 255,700

8 Claims. (Cl. 23—201)

For a long time a reaction has been known involving recovery of magnesia by reacting magnesium chloride liquor with lime (German Patent No. 11,456). The great difficulty in filtering materials so obtained however, has militated against practical usage. Various suggestions have been made as to changes to improve filterability. U. S. Patent No. 1,541,116 for instance suggested operating by calcining dolomite at 1000–1200° C., slaking with a deficient amount of water, 20 per cent by weight of the CaO to incompletely hydrate it, and then mixing this powder with magnesium chloride solution to quick precipitation. U. S. Patent No. 2,021,501 suggested applying Mg(OH)₂ to Ca(OH)₂ particles apart from the main body of the brine to be treated and containing substantially no lime in free solution, and then reacting such material with the main body of the brine. In U. S. Patent No. 2,089,339 it was suggested to continuously mix CaO with water to form a slurry and quickly remove the slurry from contact with fresh CaO to inhibit growth of Ca(OH)₂ crystals during slaking, then complete the slaking to milk of lime, screen out impurities, and finally contact the milk of lime to precipitate magnesium hydroxide. These procedures are in some instances unduly complicated and difficult to control and in other instances are costly and suitable only for select materials. The present invention involves a simplified process for precipitating magnesium hydroxide from magnesium chloride solutions with lime, wherein the magnesium hydroxide forms crystals or crystalline aggregates which settle rapidly and can be readily filtered. The process is particularly adaptable to the manufacture of a low cost magnesia containing a small percentage of lime.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The limestone employed in the process may be as preferred in any instance, high calcium lime, or magnesian limes (which may be designated conveniently as dolomite). Where operating with a high calcium lime and precipitating by reaction with magnesium chloride solutions, calcium chloride is formed and a precipitate of magnesium hydroxide. Where operating with a dolomitic lime and precipitating by reaction with magnesium chloride solutions, magnesia is derived from two sources, magnesia from the solution and magnesia from the dolomitic lime. In the precipitation with high calcium limes the matter is simpler in that it is only necessary to control the precipitation of the magnesium hydroxide. In dealing with dolomitic limes however we control not only precipitation of the magnesium hydroxide, but also control or retard the hydration of the magnesia in the lime. In accordance with our invention then, a limestone, as indicated, is calcined with a small amount of available agent from the group consisting of adjacent atomic numbers 4 and 5 of the periodic system, boron and beryllium. These atomic structures have peculiar properties in this connection. Convenient boron materials are colemanite, razorite, ulexite, borax, boric acid, etc. Convenient beryllium materials are beryllium oxide, mineral beryl, phenacite, etc. The limestone may be treated in fine powder form or in granules up to about one-fourth inch or somewhat more. With porous limestone larger sizes may be used. With large porous stone it is advantageous to apply the boron in the form of solution and impregnate the particles. The amount of boron oxide required depends somewhat upon the calcining temperature, and usually may be 0.1 to 0.5 per cent. With beryllium oxide, amounts on the order of 0.05 to 0.2 per cent are usually adequate. In some instances, limestones may be selected which contain boron or beryllium minerals, thereby reducing or eliminating the amount of these materials required. The limestone may be calcined, with the agent as noted, at a temperature of about 1400–1500° C. The calcined lime is desirably ground to pass a 50 mesh screen and preferably with but a small amount of material passing a 200 mesh screen. The lime is added slowly to magnesium chloride solution. The solution may be of any desired concentration from a fraction of a per cent up to about 12 or even 14 per cent. The solution may also advantageously contain calcium chloride without interfering with the precipitation. The amount of magnesium chloride solution should preferably be slightly in excess of that required to theoretically react with all of the lime. The mixture is agitated slowly or stirred periodically. The temperature may be for instance 10 to 50° C. Magnesium hydroxide forms, and it usually requires one to four hours for the magnesium chloride to react almost completely with the calcium oxide. If the end product is desired primarily for refractory purposes it can contain several per cent of calcium oxide advantageously. The magnesia product can be filtered off to give however, any desired calcium content. The rate of reaction will depend upon the concentration and temperature of the magnesium chloride solution and the size of the lime particles, the amount of boron or beryllium added to the lime and the heat treatment given the lime.

Where dolomite is used, the product will usually consist of a mixture of magnesium hydroxide and magnesia with perhaps a small percentage of lime, and it is generally desirable when using dolomitic lime to burn the lime sufficiently hard and carry the reaction through promptly and filter off the mixture of magnesia and magnesium hydroxide before the magnesia in the lime hydrates appreciably.

Materials low in impurities such as silicon, iron, aluminum, etc., will desirably be employed where products without such are desired; as otherwise these go into the product.

As an example: One hundred parts of precipitated calcium carbonate were calcined with 2 parts of razorite in a kiln at about 1450° C., for 3 or 4 hours. The fairly porous product shows essentially small calcium oxide crystals. This material, crushed to about 65 mesh, is added in amount of 18 parts to about 375 parts of a solution containing approximately 8 per cent $MgCl_2$ and 4 per cent $CaCl_2$. The mixture being stirred slightly, after 4 to 10 hours the precipitate settles rapidly and the clear solution may be decanted off, and the sludge be filtered rapidly. The product, dried in air substantially free from carbon dioxide, consists essentially of plates or aggregates of magnesium hydroxide, a small percentage of calcium hydroxide crystals being in association. Magnesium hydroxide fibers of a length of 50 microns are seen on microscopic examination.

As another example: Dolomite crushed to about minus 65 mesh, is mixed, in portion of one thousand parts with about 4 parts of boric acid, and is calcined in a furnace to about 1450° C. The calcined product, crushed to about one-fourth inch size, is added in amount of about 16 parts to 1,000 parts of solution containing 40 parts of $MgCl_2$ and 80 parts $CaCl_2$, and is stirred slowly about an hour, and is followed by decantation and filtering. The product filters easily, and consists essentially of $Mg(OH)_2$ and $MgO$. After air drying, it analyzes about 19.9 per cent ignition loss, 2.7 per cent CaO, and the balance essentially magnesia.

As another example: Dolomite was ground with 1.8 per cent of boric acid and calcined at approximately 1450° C. The calcine was crushed so that approximately all passed an 80 mesh screen. This lime was added and slowly agitated in a slight excess of a 7 per cent magnesium chloride solution. After two hours the resultant calcium chloride and magnesium chloride solution was decanted off and the residue quickly filtered and washed. The air dried filter cake consisted of magnesium hydroxide and magnesia and analyzed less than 0.7 per cent of CaO.

As another example: A high quality high calcium limestone was ground with 1.8 per cent of boric acid and the mixture was calcined at approximately 1500° C. The calcine crushed to minus 80 mesh was added to a 7 per cent magnesium chloride solution and the mixture agitated slightly. After two hours the magnesium residue was thickened and filtered. The dry magnesium residue contained 3.0 lime.

As another example: A high calcium limestone was ground with 0.1 per cent BeO and the mixture was calcined at approximately 1450° C. The calcine was crushed to minus 80 mesh and added to a slight excess of 7 per cent $MgCl_2$ solution and after slowly agitating for two hours the magnesian residue was allowed to settle, which it rapidly does, and the supernatant liquid was decanted. The residue which was filtered to remove the balance of the liquid was then air dried. The magnesian residue contained 8 per cent CaO.

As another example: Dolomite was ground with 0.1 per cent BeO and calcined at approximately 2600° F. The calcine was crushed to pass a 65 mesh screen. This lime was added and slowly agitated in a slight excess of a 7 per cent magnesium chloride solution. After two hours contact with the solution the magnesian residue was permitted to settle which it does very quickly and the supernatant liquid was removed. The residue was easily filtered, and after air drying the product contained 6.5 per cent CaO.

Other modes of applying the principle of the invention may be employed, change being made as regards the details described, provided the features stated in any of the following claims, or the equivalent of such, be employed.

We therefore particularly point out and distinctly claim as our invention:

1. A process of obtaining hydrated magnesia in easily filterable form, which comprises calcining dolomite with a small amount of material providing boron, crushing the product and reacting with magnesium chloride in slight excess, stirring with a solution containing chlorides of magnesium and calcium, and filtering.

2. A process of obtaining hydrated magnesia in easily filterable form, which comprises calcining a limestone with a small amount of material providing boron, crushing the product and reacting with magnesium chloride in slight excess, stirring with a solution containing chlorides of magnesium and calcium, and filtering.

3. A process of obtaining hydrated magnesia in easily filterable form, which comprises calcining dolomite with a small amount of material providing beryllium, crushing the product and reacting with magnesium chloride in slight excess, stirring with a solution containing chlorides of magnesium and calcium, and filtering.

4. A process of obtaining hydrated magnesia in easily filterable form, which comprises calcining a limestone with a small amount of material providing beryllium, crushing the product and reacting with magnesium chloride in slight excess, stirring with a solution containing chlorides of magnesium and calcium, and filtering.

5. A process of obtaining hydrated magnesia in easily filterable form, which comprises calcining dolomite with a small amount of material providing a member of the group consisting of berryllium and boron, stirring with a solution containing magnesium chloride, and separating the liquid and the magnesia residue.

6. A process of obtaining hydrated magnesia in easily filterable form, which comprises calcining a limestone with a small amount of material providing a member of the group consisting of beryllium and boron, stirring with a solution containing magnesium chloride, and separating the liquid and the magnesia residue.

7. A process of obtaining hydrated magnesia in easily filterable form, which comprises calcining dolomite with a small amount of material providing a member of the group consisting of beryllium and boron, reacting with a solution containing magnesium chloride, and forming a filterable magnesia product.

8. A process of obtaining hydrated magnesia in easily filterable form, which comprises calcining a limestone with a small amount of material providing a member of the group consisting of beryllium and boron, reacting with a solution containing magnesium chloride, and forming filterable magnesium hydroxide.

HARLEY C. LEE.
ELIZABETH K. LEE.